(12) United States Patent
Bacchini et al.

(10) Patent No.: US 12,355,219 B2
(45) Date of Patent: Jul. 8, 2025

(54) METHOD AND EQUIPMENT FOR INSTALLING A POWER CABLE IN A DEPLOYMENT SITE

(71) Applicant: Prysmian S.p.A., Milan (IT)

(72) Inventors: Marco Bacchini, Bernareggio (IT); Simone Manfredi, Milan (IT); Mario Genovesi, Cremona (IT)

(73) Assignee: Prysmian S.p.A., Milan (IT)

( * ) Notice: Subject to any disclaimer, the term of this patent is extended or adjusted under 35 U.S.C. 154(b) by 350 days.

(21) Appl. No.: 17/661,897

(22) Filed: May 3, 2022

(65) Prior Publication Data

US 2022/0360057 A1    Nov. 10, 2022

(30) Foreign Application Priority Data

May 6, 2021    (IT) .......................... 102021000011645

(51) Int. Cl.
*H02G 1/06* (2006.01)
*B65H 51/02* (2006.01)
(Continued)

(52) U.S. Cl.
CPC .............. *H02G 1/06* (2013.01); *B65H 51/02* (2013.01); *H01B 13/0003* (2013.01); *H02G 9/02* (2013.01); *B65H 2701/34* (2013.01)

(58) Field of Classification Search
CPC ............ H02G 1/06; H02G 9/02; H02G 1/083; H02G 9/06; H02G 1/081; H02G 9/08;
(Continued)

(56) References Cited

U.S. PATENT DOCUMENTS

| | | |
|---|---|---|
| 5,518,339 A | 5/1996 | Shimizu |
| 2022/0052515 A1 | 2/2022 | Bacchini et al. |
| 2022/0360057 A1 | 11/2022 | Bacchini et al. |

FOREIGN PATENT DOCUMENTS

| | | |
|---|---|---|
| CN | 110212458 A | 9/2019 |
| GB | 2383200 A | 6/2003 |

(Continued)

OTHER PUBLICATIONS

Ju Myeong Seok Publication Jun. 7, 2017 retrieved translation from Espacenet: https://worldwide.espacenet.com/patent/search/family/059223635/publication/KR20170061932A?q=KR20170061932A(Year: 2017).*

(Continued)

*Primary Examiner* — Eric J Rosen
*Assistant Examiner* — Christopher Soto
(74) *Attorney, Agent, or Firm* — Slater Matsil, LLP

(57) ABSTRACT

Method and Equipment for Installing a Power Cable in a Deployment Site The present disclosure relates to a method for installing a single power cable span in a deployment site comprising a rail for supporting the single cable span by trolleys, the method comprising the steps of providing a conveyor belt outside of the deployment site, the conveyor belt having a plurality of locations set at a predetermined distance one from the other along a longitudinal movement direction of the conveyor belt and moving integrally with the latter; repeating the following steps until the single cable span reaches a predetermined position while the conveyor belt is moving, positioning a first part of a holder at one of the locations; while advancing the single cable span, laying a portion thereof on said first part of the holder positioned at the location moving with the conveyor belt; connecting a second part of the holder to the first one to lock the cable span portion in between; while the cable span portion locked by the holder is leaving the conveyor belt, removing the first (Continued)

part of the holder from the location moving with the conveyor belt. According to another aspect, the present disclosure relates to an equipment for the installation of a single power cable span in a deployment site.

20 Claims, 7 Drawing Sheets

(51) Int. Cl.
  *H01B 13/00* (2006.01)
  *H02G 9/02* (2006.01)
(58) Field of Classification Search
  CPC ............... B65H 51/02; B65H 2701/34; H01B 13/0003; G02B 6/50; G02B 6/502
  See application file for complete search history.

(56) References Cited

FOREIGN PATENT DOCUMENTS

| GB | 2468883 A | | 9/2010 |
|----|-----------|---|--------|
| GB | 2495503 A | | 4/2013 |
| GB | 2554873 A | | 4/2018 |
| KR | 20170061932 A | * | 6/2017 |
| KR | 101915432 B1 | | 11/2018 |

OTHER PUBLICATIONS

Ju Myeong Seok Jun. 7, 2017 retrieved translation from Espacenet: https://worldwide.espacenet.com/patent/search/family/059223635/publication/KR20170061932A?q=KR%2020170061932%20A (Year: 2017).*

* cited by examiner

METHOD AND EQUIPMENT FOR INSTALLING A POWER CABLE IN A DEPLOYMENT SITE

CROSS-REFERENCE TO RELATED APPLICATIONS

This application claims priority to Italian Application No. 102021000011645, filed on May 6, 2021, which application is hereby incorporated herein by reference.

TECHNICAL FIELD

The present disclosure relates to a method and an equipment for installing a power cable in a deployment site.

BACKGROUND

Underground cables, when compared to equivalent overhead lines, are more expensive because they have to be bigger to reduce the electrical resistance and the heat produced, they need special insulation and/or cable cooling, generally provided by forced air ventilation or water cooling. This results in higher manufacturing and deployment costs.

However, underground cables help in ensuring uninterrupted power supply that is hitherto less common in overhead systems due to, e.g., heavy winds and gales, failure of supporting structures, etc. Underground cables can transmit power across densely populated areas where land is costly or environmentally or aesthetically sensitive. Therefore, in certain areas, the benefits of underground cables outweigh disadvantages of undergrounding.

Among the cable underground installation methods, tunnel installation, whose depth is typically about 25-30 meters, is generally used in urban locations where direct bury installation would cause unacceptable disruption or to cross physical obstacles such as rivers, lakes etc. This has the advantage that other underground services such as water and sewerage are unaffected, and there is a larger freedom of selecting the cable path, which, for example, can cross rivers or railways.

The installation of underground cable in air (i.e., not buried in soil) which includes, for example, a tunnel, presents some difficulties. The cable is supplied on drums. Generally, a single cable span on a drum is shorter than the deployment site, like a tunnel, thus a plurality of joints is requested with increase of cost, installation time, and safety issues. Additionally, since, as explained, high voltage cables for undergrounding are heavy (for example, a 400 kV cable weighs about 40 kg/m), deploying a single cable for a length, e.g., greater than 2 km presents problems in terms of managing of the supplier drum and pulling force exerted on the cable.

Systems have been proposed for cable installation in air by supporting cable on trolleys connected to pulling rope or other arrangement, which enable the cable to be installed to the desired position. However, the connection of the cable to the plurality of trolleys needed for deploying the cable is a lengthy operation and could result in an uneven spacing of the trolleys along the cable length.

GB 2383200 relates to cable installation in tunnels. The cable is supplied on a drum and motorized rollers are used to lead the cable to the top of the tunnel. Inside the tunnel, the cable is supported from a support beam by beam rollers which support a cable hanger. The beam rollers can roll along the support beam, carrying the cable with them. As the cable is advanced, beam rollers are provided at the tunnel opening. The cable is fully unrolled and supported along its entire length by the support beam.

CN110212458 relates to an apparatus and process for automatically laying a cable in a tunnel. The apparatus comprises a guide rail disposed along the tunnel, and provided with a tractor, wherein the tractor includes a traction frame with claws fixed thereon. Firstly, the cable passes through a guiding device and is fixed on the claw; then the position of the claw is adjusted, so that the cable falls in a recessed portion, and finally the motor is driven to drive the traction frame to move.

SUMMARY

Embodiments of this application provide a method and an equipment for installing a power cable in a deployment site, e.g. a tunnel, where a long cable span, e.g. longer than 2 km, can be deployed without the need of joints in an easy, quick and precise manner.

Embodiments of this application provide a method and an equipment for installing a power cable in a deployment site comprising a tunnel, where a long cable span, e.g. longer than 2 km, can be deployed without the need of personnel inside the tunnel and without using bulky and expensive apparatus.

Embodiments disclose a method and an equipment where a plurality of successive holders, for example comprising a half-clamp, are positioned at a predetermined distance on a conveyor belt outside of the deployment site (e.g., a tunnel) and successively engaged by the cable span. The holders engaged by the cable span are connected to trolleys suitable to slide along a rail in the tunnel. Therefore, the cable span engagement by the holders and, consequently, its connection to the trolleys are quick and easy.

Accordingly, the present disclosure relates to a method for installing a single power cable span in a deployment site comprising a rail for supporting the single cable span by trolleys, the method comprising the steps of: providing a conveyor belt outside of the deployment site, the conveyor belt having a plurality of locations set at a predetermined distance one from the other along a longitudinal movement direction of the conveyor belt and moving integrally with the latter; repeating the following steps until the single cable span reaches a predetermined position: while the conveyor belt is moving, positioning a first part of a holder at one of the locations; while advancing the single cable span, laying a portion thereof on said first part of the holder positioned at the location; connecting a second part of the holder to the first one to lock the cable span portion in between; while the cable span portion locked by the holder is leaving the conveyor belt, removing the first part of the holder from the location moving with the conveyor belt.

According to an embodiment, the second part of the holder is engaged to one of the trolleys before being connected to the first part.

According to an alternative embodiment, the second part of the holder is engaged to one of the trolleys after having been connected to the first part.

According to a further alternative embodiment, the second part of the holder is engaged to one of the trolleys once the first part is removed from its location.

In an embodiment, the conveyor belt moving is caused by the single cable span advancing.

In an embodiment, the conveyor belt comprises an entry zone, a releasing zone and an intermediate zone between the entry zone and the releasing zone. The single cable span is laid on each first part of a holder at the intermediate zone.

In an embodiment, the first part of a holder is positioned at a location in the entry zone of the conveyor belt.

In an embodiment, the holder device leaves the location at the conveyor belt releasing zone.

In an embodiment, the holders are provided at locations set at a distance which is the same for a given cable deployment.

In an embodiment, the method of the present disclosure further comprises the step of coupling the trolleys to a guiding rail or to a rail.

According to another aspect, the present disclosure relates to an equipment for the installation of a single power cable span in a deployment site comprising: at least one rail to be fixedly installed in said deployment site; a plurality of trolleys slidably couplable to the at least one rail; a plurality of holders for releasably connecting the single cable span to said trolleys, each holder comprising a first part and a second part; a conveyor belt having a plurality of locations arranged at a predetermined distance one from the other along a longitudinal movement direction of the conveyor belt and movable integrally with the latter, wherein each of the locations is suitable for positioning the first part of one of said holders.

In an embodiment, the locations are in form of strips extending transversally with respect to the conveyor belt translational movement direction.

In an embodiment, the second part of the holder is connected or connectable to one of said trolleys.

In an embodiment, the at least one rail comprises a guiding rail.

In an embodiment, each of said trolleys comprises a rope clamp for releasably connecting the trolley to a pulling rope.

BRIEF DESCRIPTION OF THE DRAWINGS

Further characteristics and advantages will be more apparent from the following description of some embodiments given as a way of an example with reference to the enclosed drawings in which.

DETAILED DESCRIPTION OF ILLUSTRATIVE EMBODIMENTS

Figure 1A:
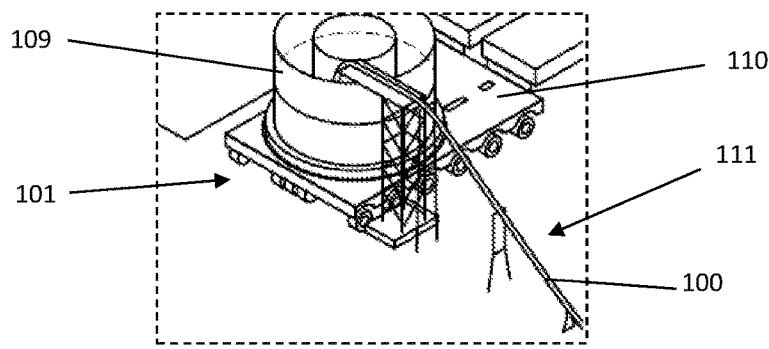
FIGS. 1s-1f show exemplary steps for carrying an HV cable near a tunnel entrance according to an embodiment of the method of the present disclosure.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present disclosure, in at least one of the aforementioned aspects, can be implemented according to one or more of the following embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

With reference to the attached Figures, the method and the equipment according to the present disclosure describe installing a single span of HV cable 100 in an intended deployment site. For example, a single span of HV cable 100 to be installed from a starting point 101 (FIG. 1a) to an end point 102 (FIG. 3e), wherein part of the cable path is in a tunnel 103 and the remaining parts are outside of the tunnel, can be guided from the starting point 101 to the tunnel 103 and then pulled to the end point 102, as will be hereunder described. In the case depicted, the tunnel 103 is under the ground level and the starting point 101 and the end point 102 are at the ground level. The cable path comprises an entrance shaft 104 (FIG. 1f) and an exit shaft 105 (FIG. 3e), respectively in communication with a tunnel entrance 106 and a tunnel exit 107.

As shown in FIG. 1a, the single cable span 100 can be delivered at the starting point 101 rolled in a basket or turntable or drum 109, for example carried by a vehicle 110, such as a wheeled vehicle or even a boat depending on the position of the starting point 101. The single cable span 100 can be initially unloaded from the basket 109 using, for example, a pick-up arm (not shown in the figures) picking up a head portion thereof and moving it in a transition structure 111 (FIG. 1b) guiding and holding the cable 100 from the basket 109 towards the entrance shaft. During the movement of the cable 100 along the transition structure 111, the cable 100 is progressively unloaded from the basket 109.

Figure 1B:
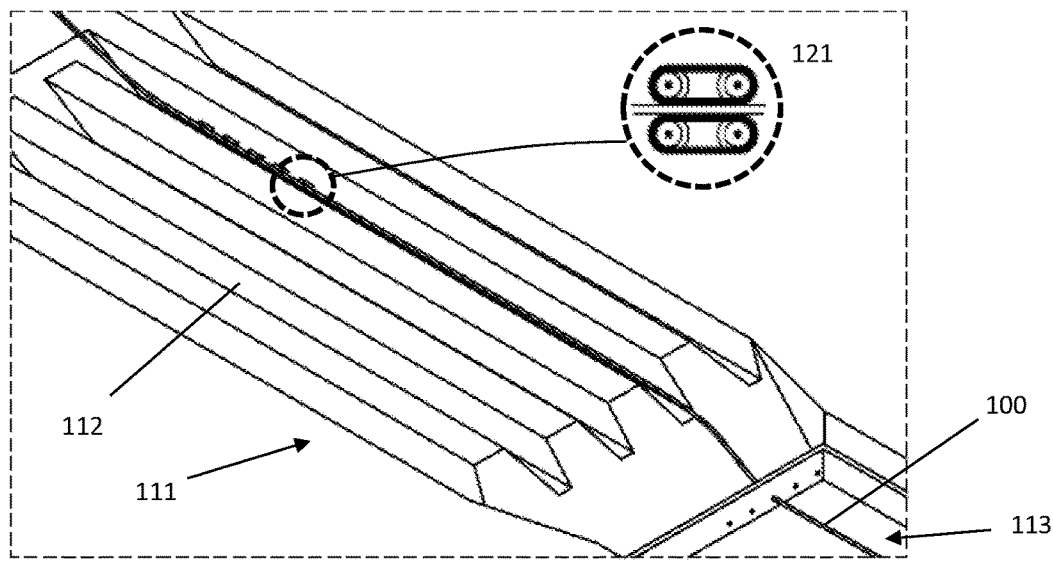

In an embodiment shown in FIG. 1b, the transition structure 111 can comprise several different structures such as metallic frames or trenches 112 generally housing rollers, chutes or pushers 121, for moving, guiding and/or easing the advance of the cable towards the entrance shaft. The transition structure 111 can also comprise a joint chamber 113 for the connection of the cable span to a cable of the network, once deployed.

Figure 1C:
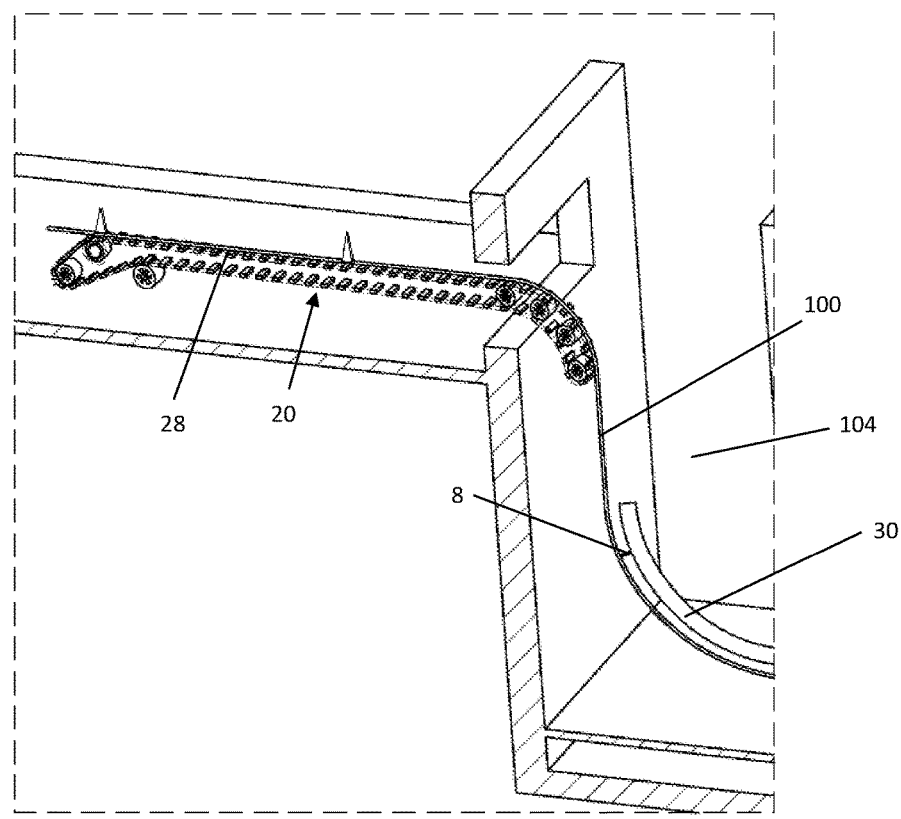
Figure 1D:
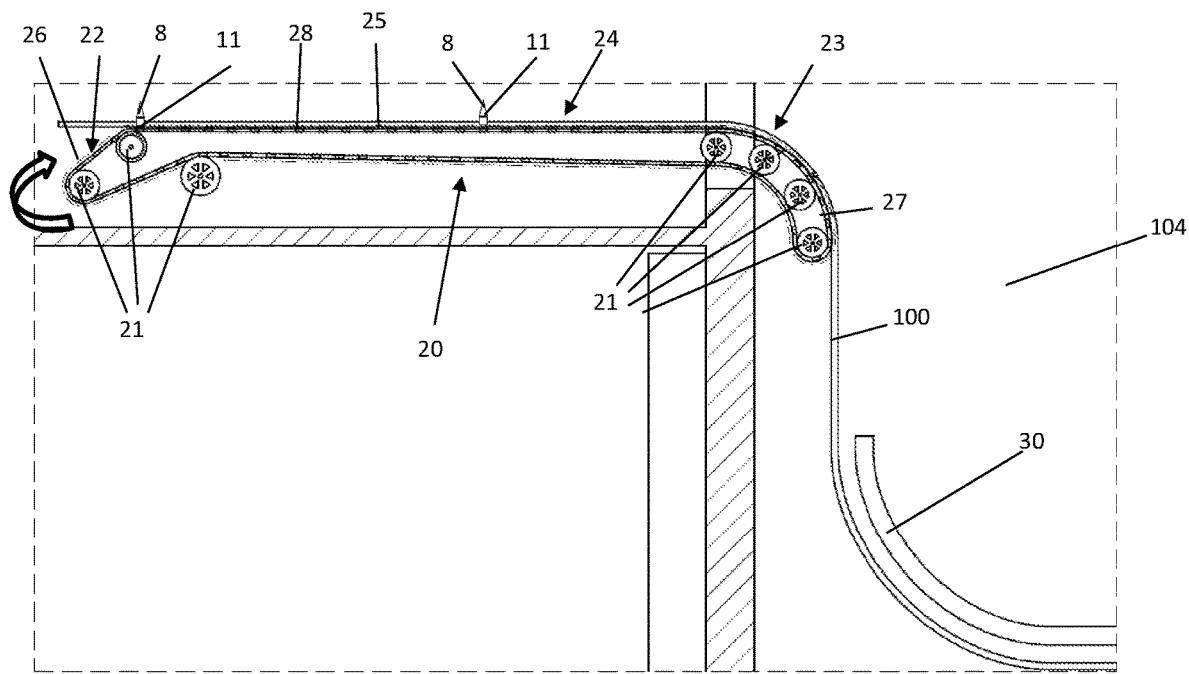

As from FIGS. 1c and 1d, a conveyor belt 20 is provided for joining the single cable span 100 to devices useful for the cable deployment. The conveyor belt 20 can be positioned downstream with respect to the transition structure 111 of FIG. 1b. For example, the conveyor belt 20 can be positioned at a ground level with respect to the entrance shaft 104 and the tunnel entrance 106 (see also FIG. 1f). However, according to another embodiment, the conveyor belt 20 can be positioned at a different location and/or at a different level with respect to the ground.

The conveyor belt 20 forms a closed loop and is supported by a plurality of, optionally idle, rollers 21 determining the overall shape of the conveyor belt 20. The conveyor belt 20 has an entry zone 22, where the cable span 100 arrives at the conveyor belt 20, a releasing zone 23, where the cable span 100 leaves the conveyor belt 20, and an intermediate zone 24 between the entry zone 22 and the releasing zone 23, where the cable span 100 is supported by the conveyor belt 20. When, according to the embodiment described, the rollers 21 are idle, the cable span 100 translational movement causes an integral translational movement of the intermediate zone 24 of the conveyor belt 20 and consequently the rotational movement (in clockwise direction, with reference to the FIG. 1d) of the conveyor belt 20. The conveyor belt 20 intermediate zone 24 comprises an upper side 25 where the cable span 100 is actually connected to the conveyor belt itself, which is preferably horizontal.

In an embodiment, the conveyor belt entry zone 22 may comprise an upper side 26 which forms an inclined surface whose height increases towards the intermediate zone 24 upper side 25.

In an embodiment, the conveyor belt releasing zone 23 may comprise an upper side 27 which forms a decreasing surface whose height decreases from the intermediate zone 24 upper side 25. The so formed decreasing surface may be suitable for guiding the single cable span 100 downward for example when the tunnel 103 is at a lower level than the conveyor belt.

The conveyor belt 20 comprises a plurality of locations 28 arranged at a predetermined distance one from another along the longitudinal movement direction of the conveyor belt 20 and moving integrally with the latter. In an embodiment, the locations 28 are in the form of strips extending substantially perpendicularly with respect to the conveyor belt 20 translational movement direction. The locations 28 can have any suitable form, from painted sign to marking strips to blocks optionally shaped to support a first part 13' of a holder 11 while the conveyor belt advances.

In an embodiment, each holder 11, specifically a second part 13" thereof, is connected to a trolley 8, as detailed in the following.

Figure 1E:
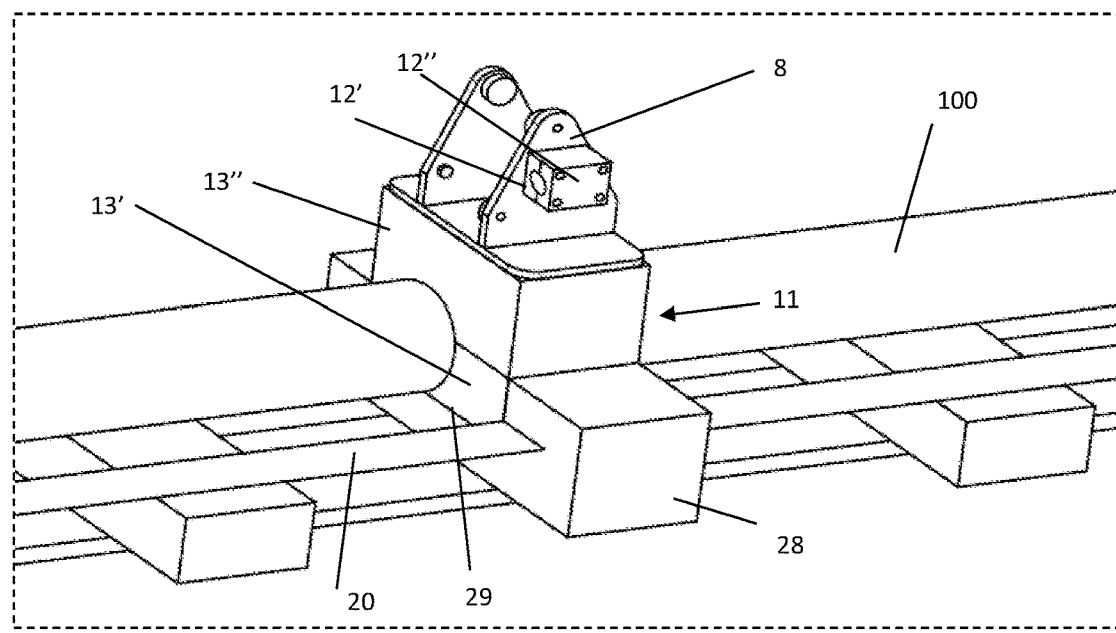

With reference to the embodiment detailed in FIG. 1e, each location 28 may comprise a seat 29 where the first part 13' of the holder 11 is placed to house a cable span portion during the movement along the conveyor belt, for example along the intermediate zone 24 thereof. Once the cable span portion engaged the first part 13', the second part 13" of the holder 11 is joined to the first part 13', for example by a fastener (not shown), to lock a cable span 100 portion within in a releasable manner. In an embodiment the second part 13" is connected to a trolley 8 at a side opposite to that joining the first part 13'.

A plurality of holders 11 can be positioned in respective locations 28 of the conveyor belt 20 at a predetermined distance. The distance between two holders 11 (and, accordingly, between the two locations occupied by such holders 11) is generally the same for all the holders 11 used for a given cable deployment. During the cable deployment, not all of the locations 28 are occupied by a respective holder 11. For example, in the FIG. 1d two holders 11 carrying respective trolleys 8 are shown at a distance of fourteen intermediate locations between each other. In correspondence of each locations 28 occupied by one holder 11, the cable span 100 portion is supported by the respective holder 11.

In an embodiment, the holder 11 may comprise a first part 13' and a second part 13" which are releasably connectable in such a manner so to lock a cable span 100 portion. For example, the holder 11 may be a clamp and the first part 13' and the second part 13" are two clamp halves. In an embodiment, the second part 13" may, in turn, be made of two sub-parts. One of the sub-parts may be suitable for the connection to the first part 13', and the other sub-part may be suitable for the connection to the trolley 8.

In an embodiment, each holder 11, in particular its first part 13', and locations 28 are configured such that when the cable span 100 portion connected to the holder 11 leaves the conveyor belt 20, the holder 11 vacates the location 28 without the need of any further intervention, for example by a user.

Figure 1F:
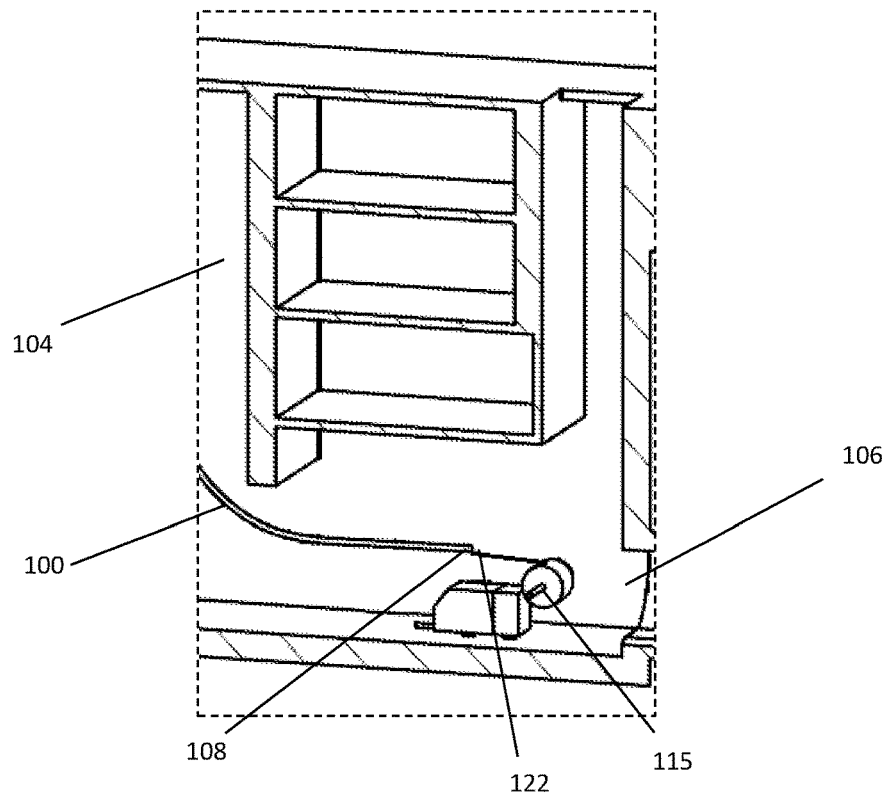

Each holder 11 may comprise or be connectable to a respective trolley 8. In an embodiment, the second part 13" of the holder 11 is connectable to said trolley 8. The trolley 8 is suitable to slide along a guiding rail 30 which can be positioned along or downstream the conveyor belt 20 (the latter configuration being that of FIGS. 1c-1d), for example near the releasing zone 23, for guiding the single cable span 100 towards the tunnel entrance 106, as shown in FIGS. 1d and 1f. The guiding rail 30, therefore, supports the trolley 8 which in turns supports the cable span 100 after it left the conveyor belt 20. In the case the conveyor belt 20 and the tunnel 103 are at different level, the guiding rail 30 forms a path along the entrance shaft 104 for guiding the single cable span from the level where the conveyor belt 20 is located to the level where the tunnel 103 is located.

It is to be noted that the guiding rail 30 can be quite short or even missing, for example if the conveyor belt 20 and the tunnel 103 are at the same level and/or at a short distance.

As from FIG. 1f (where, just for the sake of clarity, the guiding rail 30 and the rail 1 are not depicted), in order to position the head portion 108 of the cable span 100 near the tunnel entrance 106, an auxiliary pulling device, such as an auxiliary entrance winch 115, can be provided at the bottom of the entrance shaft 104 to pull the cable head portion 108 near the tunnel entrance 106 through an entrance auxiliary rope 122. The above-mentioned pushers 121 and the auxiliary entrance winch 115 can be driven in a synchronized manner.

Figure 2A:
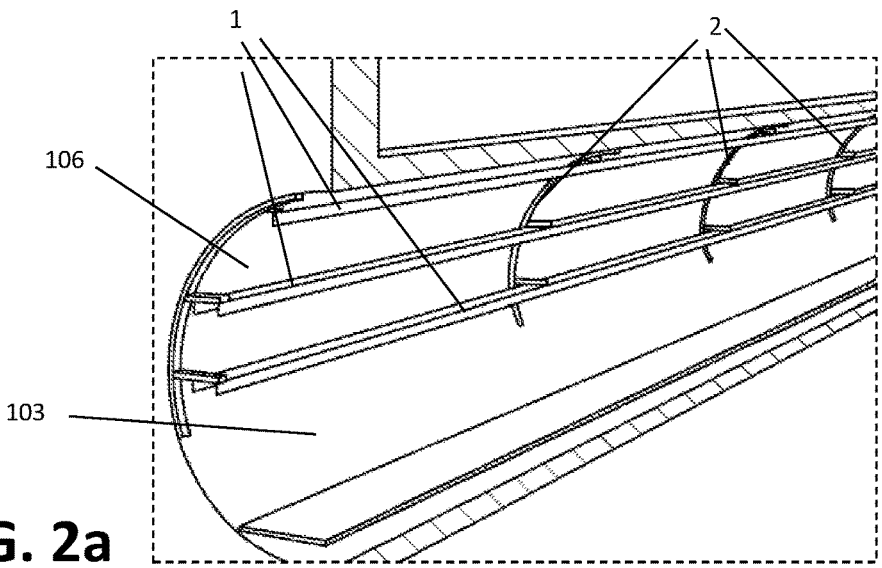
FIGS. 2a-2c and 3a-3e show exemplary steps for the installation of a single span of HV cable in a tunnel.
Figure 2B:
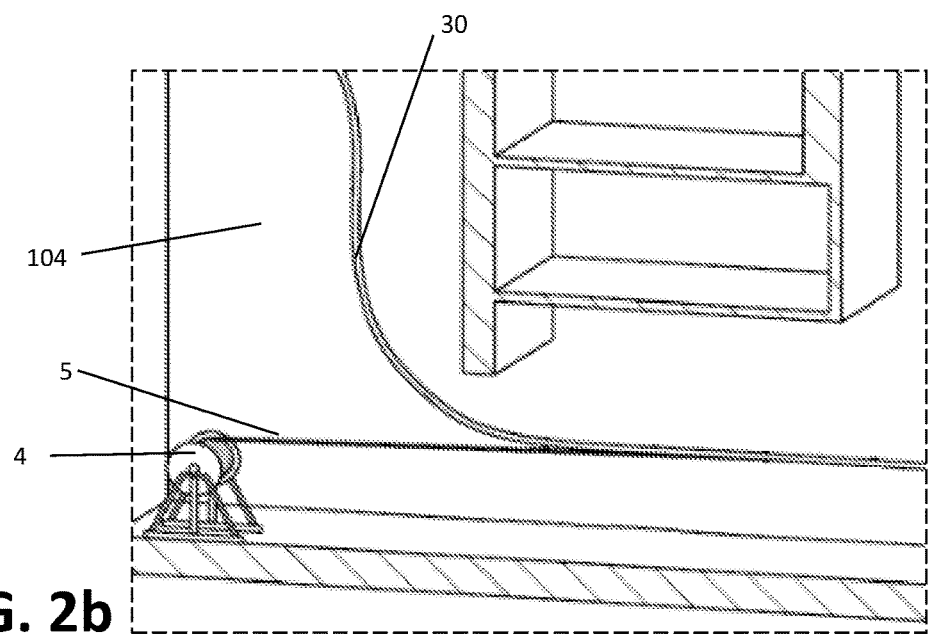
Figure 2C:
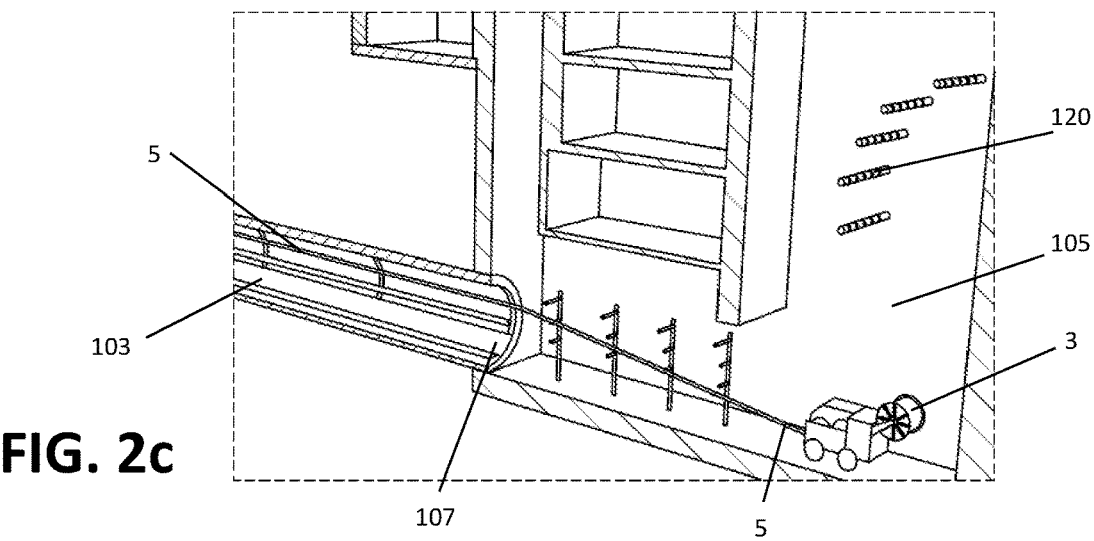

As from FIG. 2a, at least one rail 1 is installed in the tunnel 103, longitudinally extending along the same, from the tunnel entrance 106 to the tunnel exit 107 (FIG. 2c). The tunnel rail 1 can be an extension of the guiding rail 30, when the latter is provided.

In an embodiment, one rail 1 is fixed at the tunnel wall for each single cable span 100 to be deployed in the tunnel 103. In case of a plurality of cables to be installed, a corresponding plurality of rails 1, substantially parallel one another, can be installed (as from FIG. 2a), before or after the deployment of a cable span on a rail. In case of a tunnel 103 having circular or semi-circular cross section, for example, the rails 1 are installed to the tunnel wall circumferentially along the cylindrical tunnel wall, parallel to the longitudinal axis thereof.

In an embodiment, in order to install the rail 1 in the tunnel 103, a plurality of rail support structures 2 for supporting the rails 103 are fixed along the tunnel to the tunnel walls. The rail support structures 2 are, for example, made of steel and can be spaced along the tunnel length of the same distance, for example no longer than 9 meters. In an embodiment, the rail support structures 2 are arc-shaped to fit the circular or semi-circular tunnel wall, as shown for example in FIG. 2a. The rails 1 and the rail support structures 2 are fixedly installed in the tunnel 103 because they are used both for laying the single cable span 100 and for keeping the same in the tunnel 103 once the installation is completed, as will be described in more detail in the following.

Figure 3A:
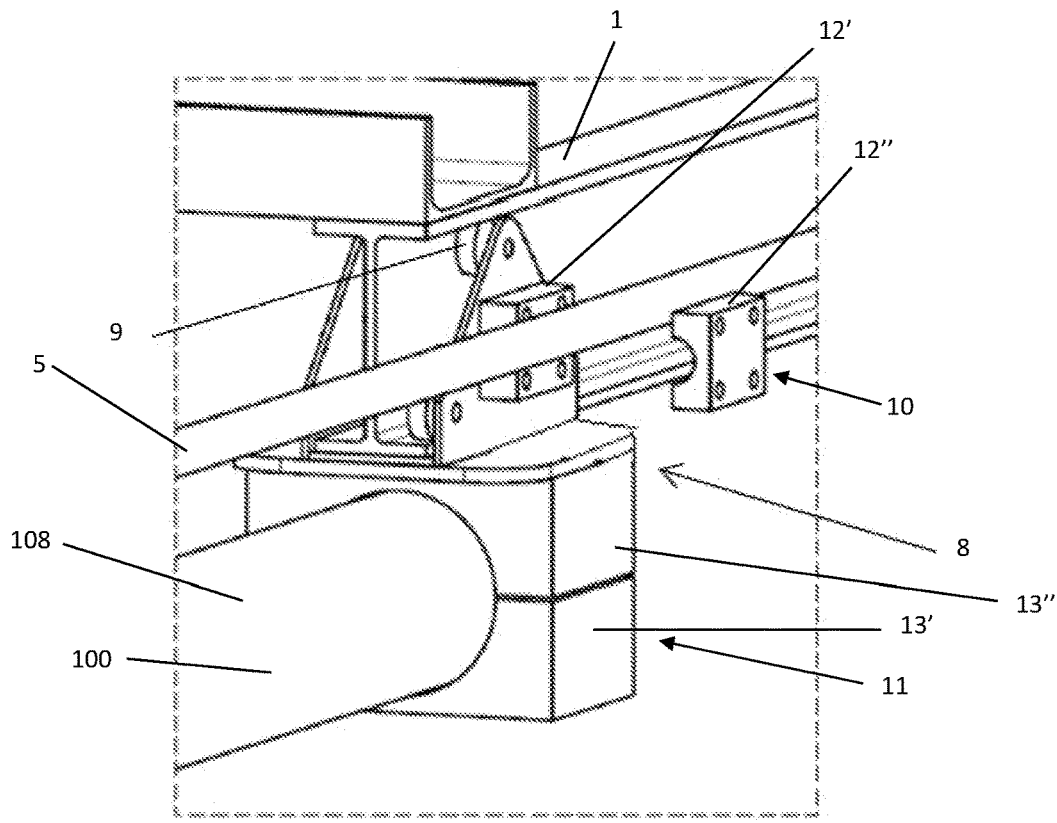

In order to minimize the friction with the guiding rail 30 and/or with the tunnel rail 1, the trolley 8 can comprise bearings 9 with low friction coefficient (as from FIG. 3a). In an embodiment, the guiding rail 30 and/or the tunnel rail 1 are I-shaped and the bearings 9 engage the I-shaped rail on both sides thereof.

In an embodiment, a pulling device 3, for example comprising a pulling winch, is installed near the tunnel exit 107, for example at the exit shaft 105, as from FIG. 2c. A rope buffer, for example comprising an idle roller 4, is provided near the tunnel entrance 106, for example at the entrance shaft 104, as from FIG. 2b. A pulling rope 5 is stored in the rope buffer, for example is wound in the idle roller 4, and, by extending longitudinally along the tunnel 103, is connected to the pulling winch 3 such that the pulling winch 3 can pull the rope 5 stored in the idle roller 4. In an embodiment, the pulling rope 5 is positioned to extend parallel to and near the rail 1.

Figure 3B:
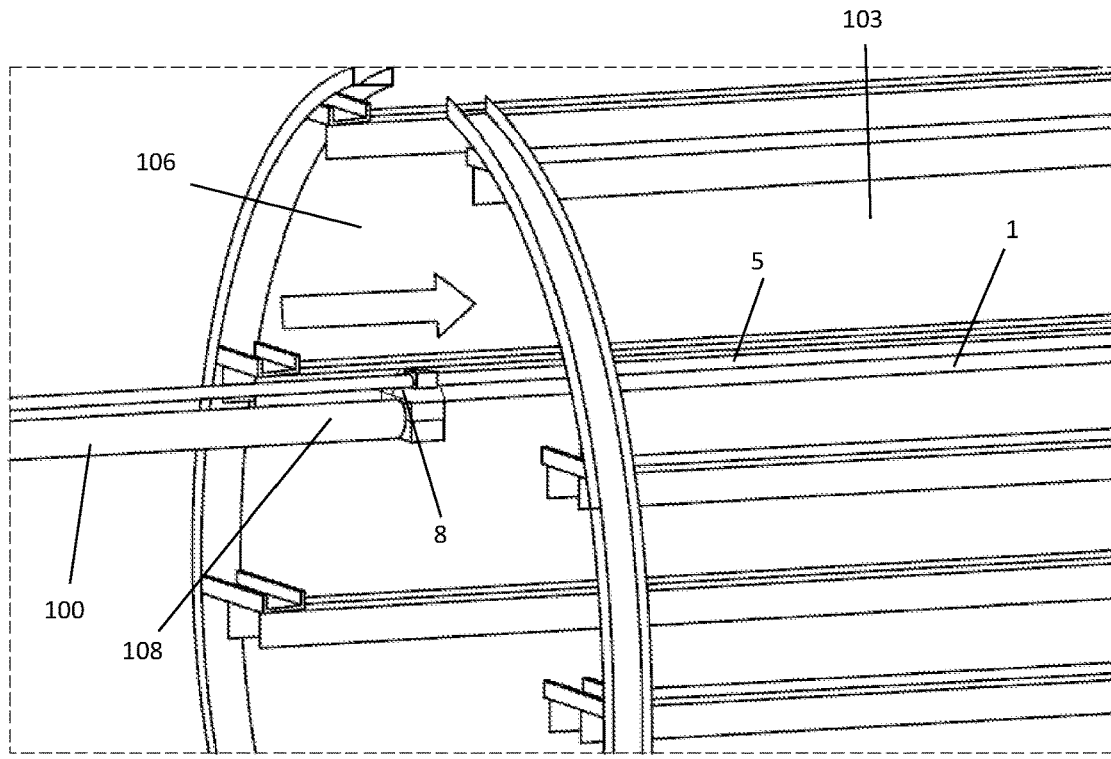

As from FIG. 3b, when the first trolley 8, connected to the cable span 100 portion at the conveyor belt 20 as described above, reaches the tunnel rail 1 from the guiding rail 30 at the tunnel entrance 106, then the trolley 8 is connected to the rope 5. To this purpose, as from FIG. 3a, the trolley 8 comprises a rope clamp 10 for the releasable connection of the rope 5 to the trolley 8. In an embodiment, the rope clamp 10 comprises two halves 12', 12". Once connected to the rope 5, the trolley 8 carrying the cable span 100 can be made to slide along the rail 1 thanks to the pulling force exerted by the pulling rope 5 and can integrally carry the cable 100 with no pulling stress exerted thereon. The pulling rope 5 is driven by the pulling device 3 (FIG. 2c).

Then, the other trolleys 8, having the same features of the first trolley 8, reach, one after the other, the rail 1 at the tunnel entrance 106 and are successively connected to the rope 5 as described for the first trolley. Each further trolley 8 is made to slide along the rail 1 as already described for the first trolley 8. During this operation, the single cable span 100 longitudinally moves further along the rail 1, accordingly.

Once the first trolley 8 reaches the tunnel rail end near the tunnel exit 107, the cable head portion 108 is detached from the first trolley 8.

Figure 3C:
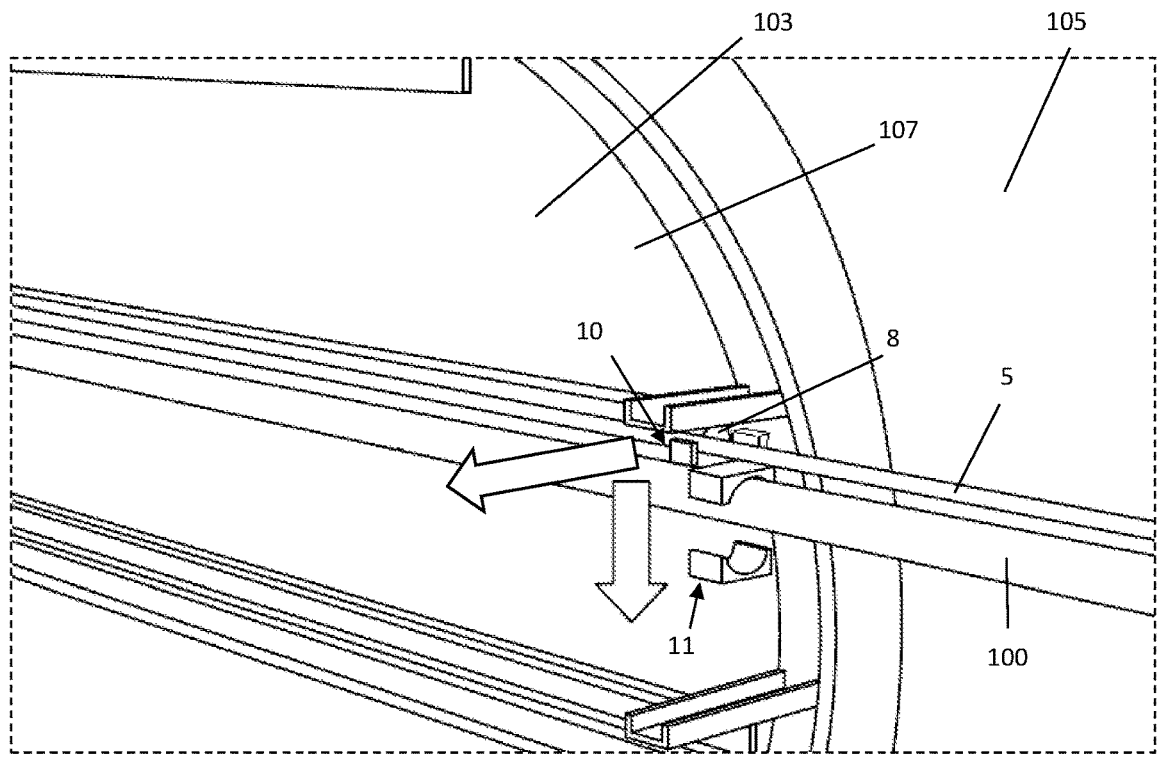
Figure 3D:
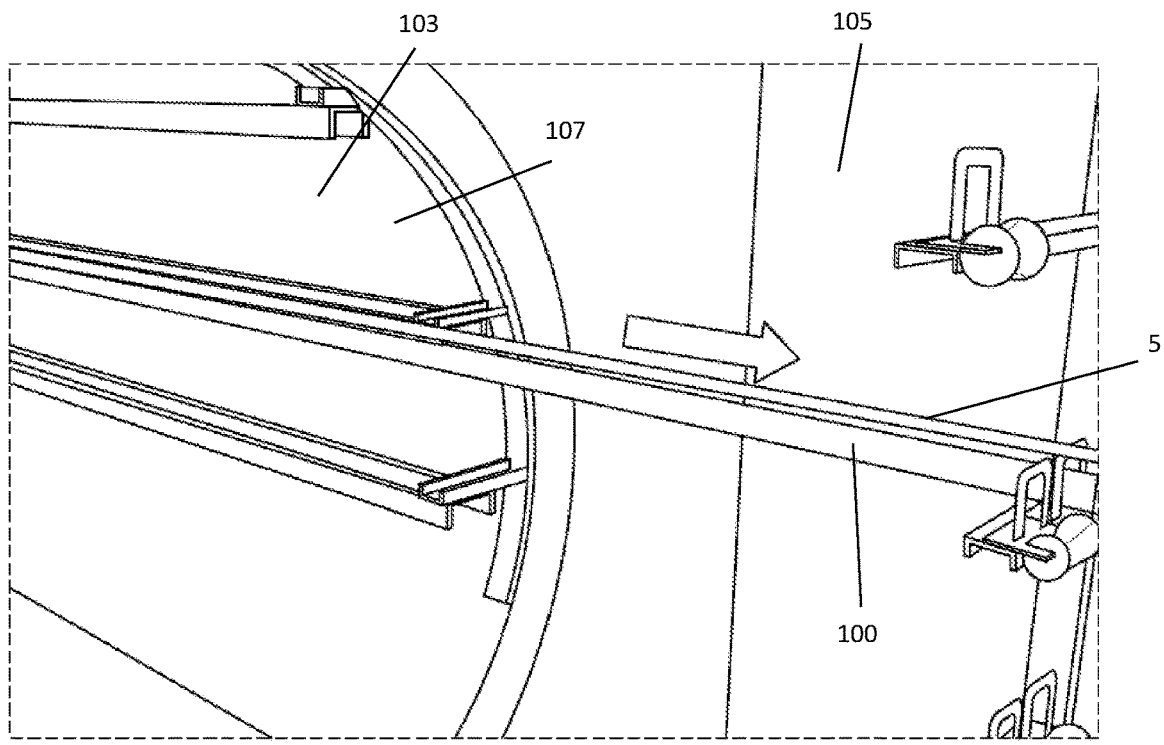
Figure 3E:
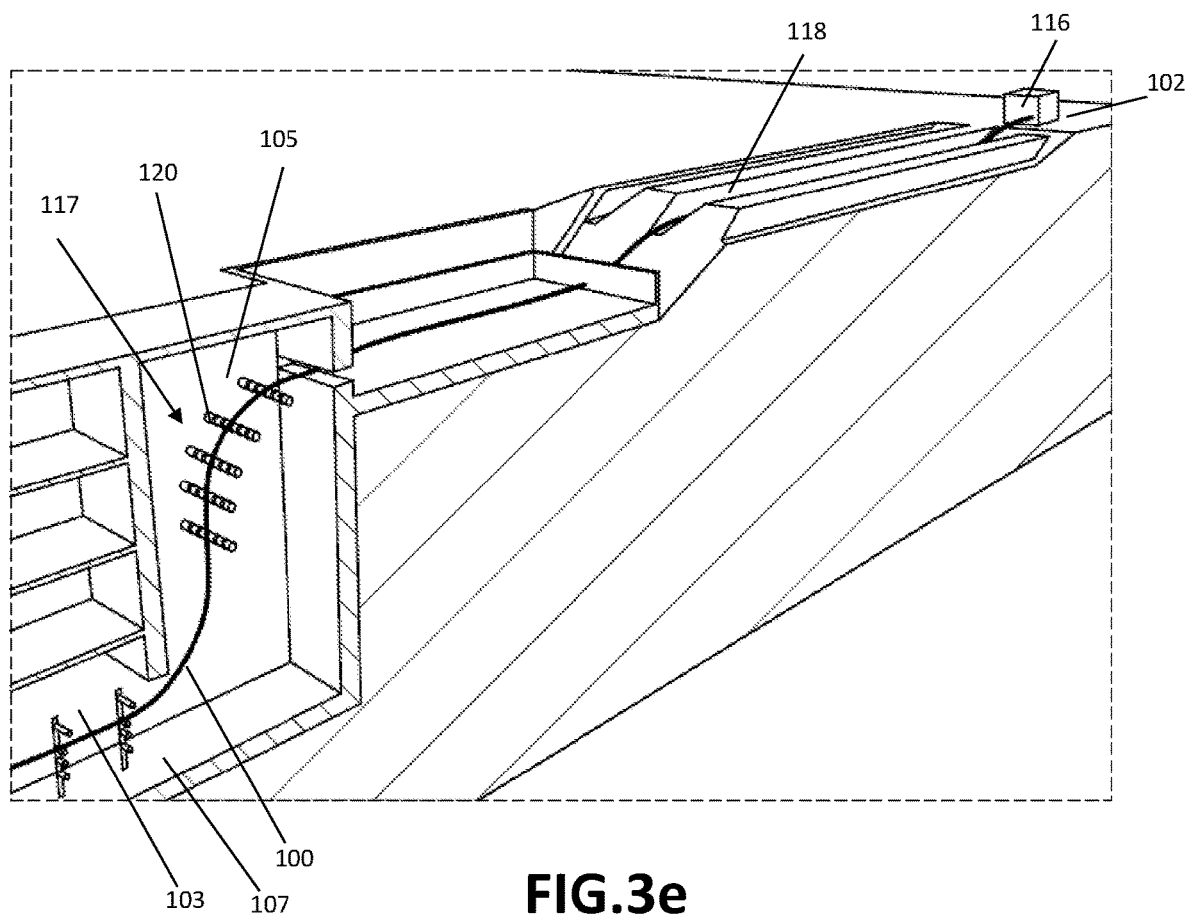

The single cable span 100 is further moved on until the cable head portion 108 is carried to and outside the exit shaft 105, particularly it reaches the overhead end point 102, as from FIG. 3e. During this moving, the cable span 100 is detached from a suitable number of trolleys 8.

In an embodiment, an auxiliary pulling device, such as an auxiliary exit winch 116, is positioned at the overhead endpoint 102 (FIG. 3e). The auxiliary pulling device drives an exit auxiliary pulling rope (not shown in the Figures) connected to the cable head portion 108 to pull the single cable span 100 towards the endpoint 102. The pulling force exerted by the exit auxiliary pulling rope on the cable head portion 108 (and, accordingly, on the single cable span 100) is relieved by the tractive force of the pulling rope 5 still operatively connected to most of the single cable span length.

An exit transition structure 117 guiding and holding the single cable span 100 and the exit auxiliary pulling rope from the tunnel exit 107 through the exit shaft 105 is provided. A second trench 118 can connect the end point 102 to the exit shaft 105.

In an embodiment, a plurality of supports 120, for example made of steel, are installed in the exit shaft 105. The supports 120 can have rollers for guiding the cable head portion 108 and the auxiliary pulling rope.

At the end point 102, cable head portion 108 of the single cable span 100 can be connected to one or more power cables of the electric network by a second joint chamber (not illustrated).

As mentioned above, in order to raise the head portion 108 of the single cable span 100 outside the tunnel 107, the pulling rope 5 and a predetermined number of trolleys 8 are disconnected from the single cable span 100, and the disconnected trolleys 8 are removed from the rail 1 (FIG. 3c). Then, as shown in the FIG. 3d, both the pulling rope 5 (which keeps on pulling the further trolleys 8 and, accordingly, the single cable span 100 connected thereto) and the exit auxiliary pulling rope (connected to the cable head portion 118) driven by the auxiliary exit winch 116 are pulled, for example in a synchronized manner, until the cable head portion 108 reaches a predetermined position outside the tunnel, for example until it reaches the endpoint 102. Depending on the length of the single cable span 100 to be extracted from the tunnel 103, beside the first trolley 8, further trolleys 8 can be sequentially disconnected from the pulling rope 5 and from the single cable span 100 and removed from the rail 1.

In an embodiment, once the cable head portion 108 reached the endpoint 102, at least a number or all of the trolleys 8 inside the tunnel 103 can be left in position, optionally locked, on the rail 1, thus providing a permanent support for the deployed cable span 100. The choice about the number of trolleys 8 to be left into the tunnel 103 can be determined by installation considerations like the cable weight or the sought sagging.

Similarly, once the cable head portion 108 reached the endpoint 102, a number of trolleys 8 may remain along the guiding rail 30, if provided. These trolleys can be left in position, optionally locked, on the guiding rail 30.

According to an embodiment, when the cable head portion 108 reached a predetermined end point outside of the tunnel, the pulling rope is left joined to the trolleys inside the tunnel.

Accordingly, a method for installing the single power cable span 100 in a deployment site comprising a rail for supporting the single cable span, for example the tunnel rail 1, comprises the steps of: providing a conveyor belt 20 as described above; repeating the following steps until the cable span 100 reaches a predetermined position (such as, for example, the tunnel entrance 106 or the endpoint 102): while the conveyor belt 20 is moving, positioning a first part 13' of the holder 11 to one of the locations 28, for example at the conveyor belt entry zone 22. In an embodiment, this step comprises engaging the first part 13' of the holder 11 in the seat 29 of one the locations 28 and is repeated for each location 28 at a predetermined distance from the previously occupied location 28. The conveyor belt 20 moving may be obtained by the single cable span 100 advancing; while advancing the single cable span 100, laying a portion of the single cable span in the part of the holder 11 positioned to the location 28 and locking this cable span portion to the holder 11. These positioning and locking steps may take place at the conveyor belt intermediate zone 24. In an embodiment, the locking step may comprise connecting the second part 13" to the first part 13" in such a manner so to clamp the cable span 100 portion between the two parts of the holder 11; while the cable span 100 portion engaged by the holder 11 is leaving the conveyor belt 20, for example at the conveyor belt releasing zone 23, removing the holder 11 from the location 28 moving with the conveyor belt 20. In an embodiment, this removing step comprises separating the first part 13' from the seat 29 of the location 28.

In an embodiment, the holder 11, for example the second part 13", comprises or is connected to the trolley 8. Alternatively, the method further comprises the step of connecting the holder 11, particularly the second part 13", already locked to the cable span portion, to a trolley 8. This step preferably takes place at the intermediate zone 24 of the conveyor belt 20.

In an embodiment, after the above-cited disengagement, the method further comprises coupling the trolley 8 connected to the cable span portion to the guiding rail 30 while the single cable span 100 is advancing. In this manner the single cable span can be guided towards a position, for example at a lower level than the conveyor belt, towards, e.g., the tunnel entrance 106.

During the above-mentioned steps, the advancing of the single cable span 100 can be obtained by pulling the head portion 108 with the auxiliary rope 122.

Once the cable head portion 108 has reached, for example, the tunnel entrance 106, if it is necessary to further move the cable span 100, for example towards another position such as the endpoint 102, the method according to the disclosure can further comprise, until it reaches said position, the following steps: at the tunnel entrance 106 connecting one trolley 8 at the tunnel rail 1. As the guiding rail 30 and the tunnel rail 1 are continuously connected so to form a single rail, this connection can be obtained by continuously moving in a slidable manner the trolley from the guiding rail 30 to the tunnel rail 1; joining the trolley 8 to the pulling rope 5; moving the trolley 8 along the tunnel rail 1 by pulling the pulling rope 5; at the tunnel exit 107 disconnecting the trolley 8 from the pulling rope 5 and from the single cable span 100 and removing it from the tunnel rail 1.

In an embodiment, the method further comprises the step of locking at least the trolley 8 nearest to the tunnel exit 107 on the tunnel rail 1 when the cable head portion 108 has reached the desired end position.

When the cable head portion reached a predetermined end point outside of the tunnel, the installation is taken as finished. Subsequently, the single cable span so installed can be connected to the power network by, for example, the first and second joint chambers mentioned above.

What is claimed is:

1. A method for installing a single power cable span, the method comprising:
   providing a conveyor belt outside of a deployment site, the conveyor belt being located at a first site and comprising a belt for supporting the single power cable span at the first site, the deployment site being located at a second site different from the first site and separated by a section of the cable span, the cable span being prepared for installation at the first site and installed at the second site, the conveyor belt having a plurality of locations set at a predetermined distance one from the other along a longitudinal movement direction of the conveyor belt, the conveyor belt moving integrally with the plurality of locations; and
   installing the single power cable span in the deployment site, the deployment site comprising a rail for supporting the single power cable span and a plurality of trolleys, the installing comprising repeating the following steps until the single power cable span reaches a predetermined position:
      while the conveyor belt is moving, positioning a first part of a holder at one of the locations,
      while advancing the single power cable span, laying a portion of the single power cable span on the first part of the holder positioned at the location moving with the conveyor belt,
      connecting a second part of the holder to the first part of the holder to lock the portion of the single power cable span laid on the first part of the holder in between, and
      while the cable span portion locked by the holder is leaving the conveyor belt, removing the first part of the holder from the location moving with the conveyor belt.

2. The method of claim 1, wherein the second part of the holder is engaged to one of the plurality of trolleys before being connected to the first part.

3. The method of claim 1, wherein the second part of the holder is engaged to one of the plurality of trolleys after having been connected to the first part.

4. The method of claim 1, wherein the second part of the holder is engaged to one of the plurality of trolleys once the first part is removed from its location.

5. The method of claim 1, wherein the conveyor belt moving is caused by the single power cable span advancing.

6. The method of claim 1, wherein the conveyor belt comprises an entry zone, a releasing zone and an intermediate zone between the entry zone and the releasing zone, wherein the single power cable span is laid on the first part at the intermediate zone.

7. The method of claim 6, wherein the first part of the holder is positioned at one of the locations in the entry zone of the conveyor belt.

8. The method of claim 6, wherein the holder leaves the location at the conveyor belt releasing zone.

9. The method of claim 1, wherein the holders are provided at locations set at a distance which is the same for a given cable deployment.

10. The method of claim 1, further comprising coupling the trolleys to a guiding rail or to a rail.

11. Equipment for installation of a single power cable span in a deployment site comprising:
    at least one rail to be fixedly installed in the deployment site;
    a plurality of trolleys slidably couplable to the at least one rail;
    a plurality of holders for releasably connecting the single power cable span to one of the trolleys, each holder comprising a first part and a second part, the first part and the second part being configured to lock a portion of the single power cable span; and
    a conveyor belt having a plurality of locations arranged at a predetermined distance one from the other along a longitudinal movement direction of the conveyor belt and movable integrally with the latter, the first part being configured to be removed when the portion of the single power cable span leaves the conveyor belt, wherein each of the locations is suitable for positioning the first part of one of the holders, the conveyor belt being located at a first site and comprising a belt for supporting the single power cable span at the first site, the deployment site being located at a second site different from the first site, the cable span being prepared for installation at the first site and installed at the second site.

12. The equipment of claim 11, wherein the locations are in form of strips extending transversally with respect to the conveyor belt translational movement direction.

13. The equipment of claim 11, wherein the second part of the holder is connected or connectable to one of the trolleys.

14. The equipment of claim 11, wherein the at least one rail comprises a guiding rail.

15. The equipment of claim 11, wherein each of the trolleys comprises a rope clamp for releasably connecting the trolley to a pulling rope.

16. A method for installing a single power cable span, the method comprising:
    providing a conveyor belt outside of a deployment site, the deployment site comprising a rail for supporting the single power cable span and a plurality of trolleys, the conveyor belt having a plurality of locations set at a predetermined distance one from the other along a longitudinal movement direction of the conveyor belt, the conveyor belt being located at a first site and comprising a belt for supporting the single power cable span at the first site, the deployment site being located at a second site different from the first site and separated by a section of the cable span, the cable span being prepared for installation at the first site and installed at the second site, the conveyor belt moving integrally with the plurality of locations; and performing a plurality of repetitive steps until the single power cable span reaches a predetermined position, each repetition of the plurality of repetitive steps comprising:

moving the conveyor belt, while the conveyor belt is moving, positioning a first part of a holder at one of the locations, advancing the single power cable span, while advancing the single power cable span, laying a portion of the single power cable span on the first part of the holder positioned at the location moving with the conveyor belt, connecting a second part of the holder to the first part of the holder to lock the portion of the single power cable span laid on the first part of the holder in between, and while the cable span portion locked by the holder is leaving the conveyor belt, removing the first part of the holder from the location moving with the conveyor belt.

17. The method of claim 16, wherein the conveyor belt moving is caused by the single power cable span advancing.

18. The method of claim 16, wherein the conveyor belt comprises an entry zone, a releasing zone and an intermediate zone between the entry zone and the releasing zone, wherein the single power cable span is laid on the first part at the intermediate zone.

19. The method of claim 18, wherein the first part of a holder is positioned at one of the locations in the entry zone of the conveyor belt.

20. The method of claim 18, wherein the holder leaves the location at the conveyor belt releasing zone.

* * * * *